United States Patent [19]

Henze et al.

[11] 4,430,823
[45] Feb. 14, 1984

[54] FISHING LINE RETENTION DEVICE

[75] Inventors: Walter J. Henze, Norristown; William A. Purcell, Philadelphia, both of Pa.

[73] Assignee: Penn Fishing Tackle Mfg. Co., Philadelphia, Pa.

[21] Appl. No.: 357,698

[22] Filed: Mar. 12, 1982

[51] Int. Cl.³ .............................................. A01K 91/00
[52] U.S. Cl. .................................................. 43/43.12
[58] Field of Search ............................. 43/43.12, 43.1; 24/115 F

[56] References Cited

U.S. PATENT DOCUMENTS 3,930,330  1/1976  Black ................................. 43/43.12
3,974,589  8/1976  Henze ................................ 43/43.12
4,012,863  3/1977  Lori .................................. 43/43.12
4,069,611  1/1978  Dusich ............................... 43/43.12
4,173,091 11/1979  Emory ................................ 43/43.12

Primary Examiner—Gene P. Crosby
Attorney, Agent, or Firm—Z. T. Wobensmith, III

[57] ABSTRACT

A fishing line retention device is disclosed for use with a trolling apparatus which detachably retains the line to the weight carried by the trolling apparatus, but permits quick detachment therefrom upon a fish strike. The device includes a body portion attached to an arm extending from a weight with a pivotally mounted body portion attached to the first body portion having a spool detachably retaining the line.

7 Claims, 4 Drawing Figures

FISHING LINE RETENTION DEVICE

BACKGROUND OF THE INVENTION

1. Field of the Invention

This invention relates to a fishing line retention device for trolling.

2. Description of the Prior Art

When using trolling apparatus for fishing, it is necessary to provide a device for attaching the fishing line to the weight carried by the trolling apparatus, but which line may be easily detached when a fish strikes.

Many devices have been proposed for line retention which often are of the clothespin or spring operated type or comprise a structure which includes two smooth discs forced together by springs fastened to the weight and with the line carried therebetween, but none of the devices available have proven wholly satisfactory in use. Most of the devices do not permit easy detachment of the fishing line, can injure the line, or result in entanglement of the fishing line with the line from the trolling apparatus.

U.S. Pat. No. 3,974,589 shows a fishing line retention device in which the line is threaded through a portion of the device and which device always remains on the line.

The device of our invention fastens directly to the weight carried by the trolling apparatus, the fishing line is easily detached and reattached as desired, and the device possesses other advantages not found in the prior art.

SUMMARY OF THE INVENTION

A fishing line retention device is provided which includes a body portion attached to an arm extending from a weight with a pivotably mounted body portion attached to the first body and having a spool detachably retaining the line.

The principal object of the invention is to provide a fishing line retention device that provides positive control of the attachment of the fishing line to the weight from a trolling apparatus.

A further object of the invention is to provide a fishing line retention device for trolling that can be used with a variety of sizes of fishing line without modification.

A further object of the invention is to provide a fishing line retention device for trolling from which the fishing line can be quickly and easily detached and reattached to the weight from the trolling apparatus.

A further object of the invention is to provide a fishing line retention device which includes a pivotably mounted spool around which the line is wrapped until a strike occurs.

A further object of the invention is to provide a fishing line retention device for trolling that is simple and inexpensive to construct, but sturdy and reliable in operation.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figure 1:
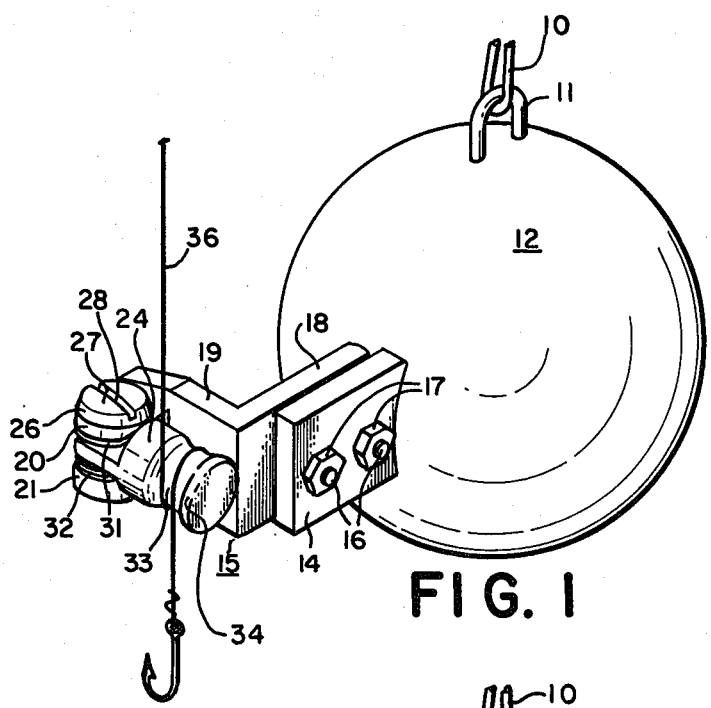
FIG. 1 is a view in perspective illustrating the device of the invention attached for use and in its initial position.

It should, of course, be understood that the description and drawings herein are illustrative merely and that various modifications and changes can be made in the structure disclosed without departing from the spirit of the invention.

Like numbers refer to like parts throughout the several views.

DESCRIPTION OF THE PREFERRED EMBODIMENT

Referring now more particularly to the drawings, a trolling weight control line 10 is shown which extends to a reel (not shown) of the trolling apparatus. The line 10 is attached to a U-shaped hook 11 of a weight 12, preferably of spherical configuration, which is preferably composed of lead with an anti-corrosive coating thereon of well-known type.

The weight 12 has an arm 14 integral therewith embedded or molded therein and extending therefrom to which an angular bracket arm 15 preferably of synthetic plastic or of aluminum treated to avoid corrosion, is secured by bolts 16 and nuts 17 which extend through an arm portion 18 of the bracket 15 from which an arm portion 19 extends at right angles.

The arm portion 19 has upper and lower lugs 20 and 21 extending therefrom. The lug 20 has an opening 22 extending therethrough and the lug 21 has a threaded opening 23.

A body portion 24 of a spool 33 is provided preferably of glass reinforcedsynthetic plastic or hard brass having a tongue 25 which is interposed between the upper and lower lugs 20 and 21. A pivot pin 26 is provided having a head 27 bearing on the upper face of the upper lug 20, a slot 28 for adjustment of the pivot pin 26, a cylindrical portion 29 in engagement in the opening 22, and a threaded portion 30 in engagement in the threaded opening 23. The pivot pin 26 has mounted thereon above the tongue 25 a washer 31, which is held against turning so as to not affect the pivot pin 26, and mounted below the tongue 25 a pair of Belleville washers 32 are provided.

The body portion 24 has a spool 33 extending therefrom, the exterior surface 33a of which has a slight degree of roughness, is not polished, and which may be aided by oxidation of the exterior surface 33a to prevent slippage of the line 36.

The arm portion 19 has a detent 35 for the reception of the rim 34 of the spool 33 when it is in the forward position shown in FIG. 1.

Figure 2:
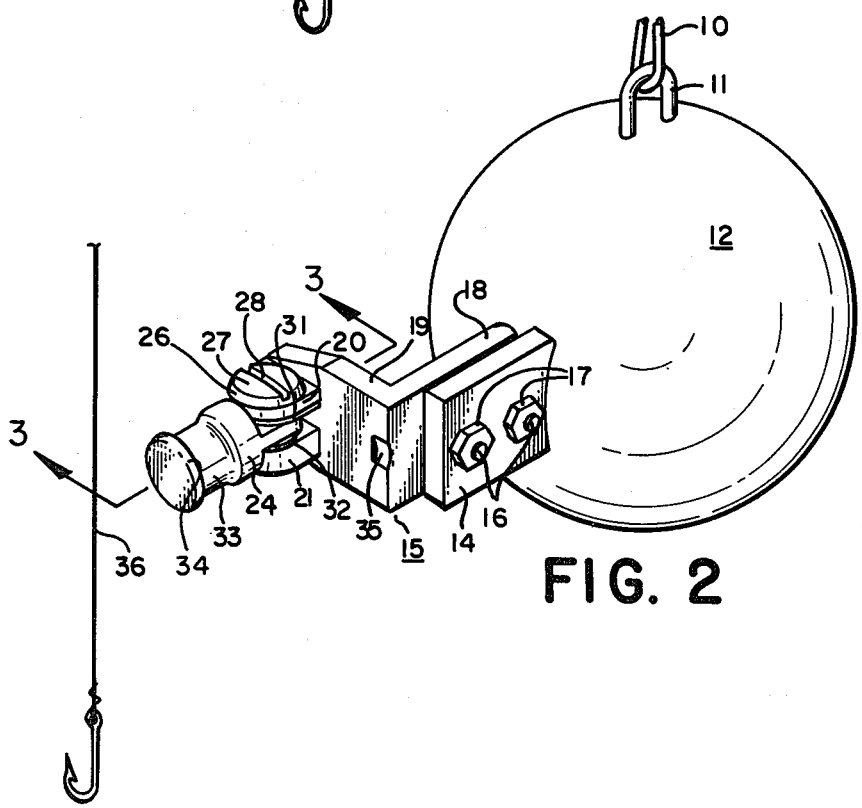
FIG. 2 is a view in perspective illustrating the device of the invention after a strike by the fish has occurred.
Figure 3:
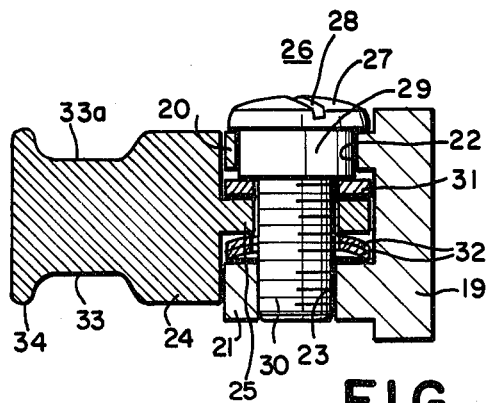
FIG. 3 is a vertical sectional view taken approximately on the line 3—3 of FIG. 2.
Figure 4:
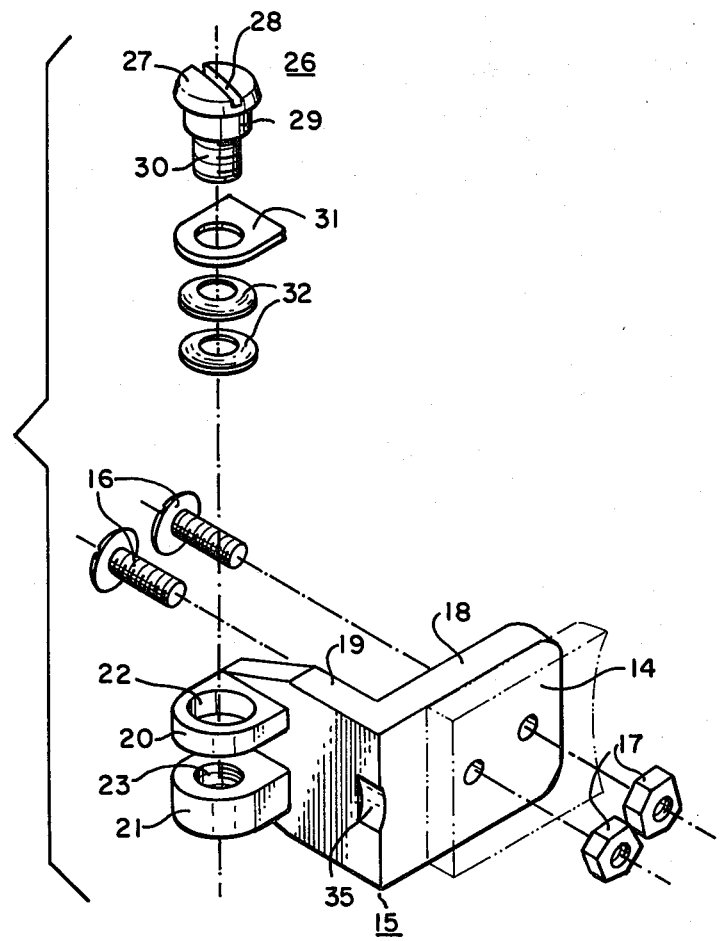
FIG. 4 is an exploded perspective view showing the mode of attachment to the weight.

In use the spool 33 is forwardly disposed (See FIG. 1) and the line 36 from the boom (not shown) is wrapped around the exterior of the spool 33. When a fish strikes, the spool 33 is moved to the position shown in FIG. 2, and the line 36 is released from its engagement with the spool 33.

We claim:

1. A fishing line retention device for attachment to a weight of a trolling apparatus and for attachment to a fishing line which comprises a bracket secured to said weight, a body portion pivotably mounted by a pivot pin on said bracket for movement in a horizontal plane from a transverse position to a rearward position, the pivot pin being engaged with portions of the body portion and the bracket and having a threaded portion in engagement with the bracket, spring washers on said pivot pin engaging a part of the body portion and said bracket, said bracket being an angular bracket with two arm portions, and said body portion having a spool carried thereby for engagement by the fishing line and for release of the fishing line in the rearward position.

2. A fishing line retention device as defined in claim 1 in which said spool is of brass with a slight degree of roughness to prevent line slippage.

3. A fishing line retention device as defined in claim 1 in which one of the arm portions of said bracket has spaced horizontal lugs for the reception therebetween of a tongue extending from said spool.

4. A fishing line retention device as defined in claim 1 in which one of the arms of said bracket has a detent for the reception of a portion of the spool.

5. A fishing line retention device as defined in claim 1 in which said bracket is of synthetic plastic material.

6. A fishing line retention device as defined in claim 1 in which said bracket is of corrosion resistant aluminum.

7. A fishing line retention device as defined in claim 1 in which said spool is of synthetic plastic.

* * * * *